March 5, 1968   H. D. CONNORS   3,371,471
SAND AND DUST COLLECTOR FOR ENGINE AIR INLETS
Filed Oct. 15, 1965
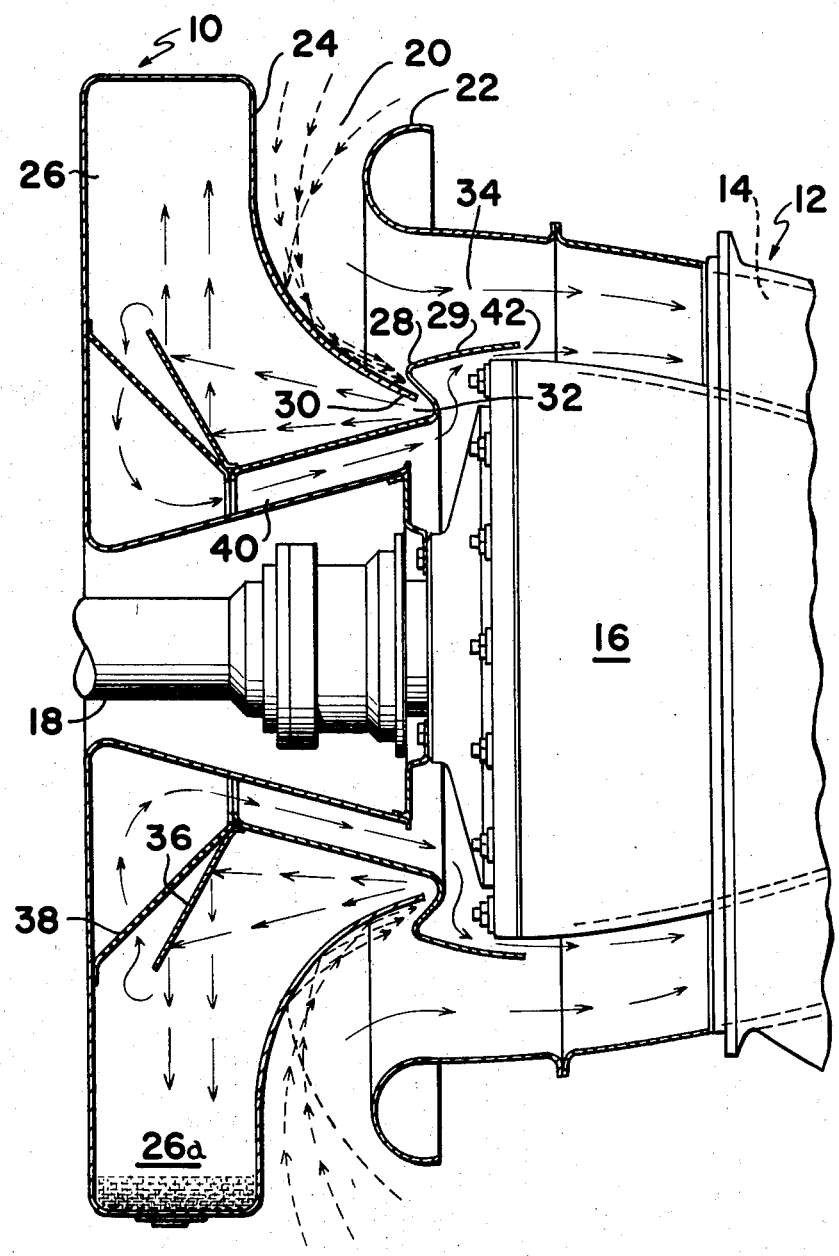
INVENTOR.
HAROLD D. CONNORS
BY
ATTORNEYS.

United States Patent Office 3,371,471
Patented Mar. 5, 1968

3,371,471
SAND AND DUST COLLECTOR FOR
ENGINE AIR INLETS
Harold D. Connors, Milford, Conn., assignor to Avco
Corporation, Stratford, Conn., a corporation of
Delaware
Filed Oct. 15, 1965, Ser. No. 496,287
2 Claims. (Cl. 55—306)

ABSTRACT OF THE DISCLOSURE

A means to separate and collect foreign particles from air entering air inlets to gas turbine engines. The air passage to the engine air inlet is provided with a curved wall positioned to receive air and particle contact. Adjacent an inner edge of this wall an adjacent wall is provided to direct separate particles and a portion of the air into an adjacent collection region and into an auxiliary air passage to complete the separation. The auxiliary air passage provides a carrying air stream allowing the main stream to continue, the auxiliary stream to be again directed into the inlet after foreign particle separation is completed. The projecting wall serves not only as the means to collect and deflect separated particles but also has an extending portion inside the collection region serving to form a part of an auxiliary passage. An extending portion of this wall toward the air inlet forms one wall of the air passage carrying a major portion of the air flow entering the engine and serves also as a portion of the auxiliary air channel exhausting air into the main flow passage thereby to induce air flow in the auxiliary passage.

---

This invention relates to a sand and dust collector primarily for use adjacent the air inlet to a gas turbine engine.

The importance of removing small foreign particles, such as sand and dust, is recognized, and other mechanisms for accomplishing this purpose are already available in the art. However, the present invention provides certain improvements recognized as important.

It is a primary object of this invention to provide the air passage to the air inlet with a curved wall, positioned to receive air and particle contact and of such configuration as to deflect particles, such as sand and dust, in such direction that they will be collected on an adjacent projecting wall and carried into an auxiliary passage to complete the separation from the incoming air. The auxiliary air passage provides a carrying air stream allowing the main air stream to continue, and the auxiliary stream to be again directed into the inlet after foreign particle separation is completed.

The above and other objects of the invention will appear more fully from the following description and by reference to the accompanying drawing, forming a part hereof and wherein:

The drawing is a longitudinal cross section taken substantially on a vertical section through the separator assembly in a vertical plane and showing the longitudinal axis of rotation of the power shaft of the engine extending forward of the annular air inlet to the engine.

Referring to the drawing, the separator assembly 10 is designed for mounting on the front of a gas turbine engine 12, having an annular air inlet 14 and a forwardly extending gear case 16 and propeller or power shaft 18. The forwardly extending power shaft 18 may not be present in the purely jet type engine, but would be present in a so-called turboshaft type of gas turbine engine, here disclosed.

The specific structure illustrated in FIGURE 1 is a cross section of an annular assembly 10 with the longitudinal axis of the shaft 18 or the axis of the engine as a center. The annular assembly 10 provides an annular air inlet 20 extending from an outward region in a generally radial inward direction, as shown in FIGURE 1, with an inner curved wall 22 and an outer curved wall 24. The front part of the assembly for collecting particles is indicated by the numeral 26 and is also annular in the disclosure. The outer curved wall 24 is of such configuration, bending in a curved direction toward the air inlet 14 so that air entering in a radial direction into the inlet 20 will be caused to move in a curved path and any particles heavier than air will be thrown by centrifugal force and flow direction to impinge upon the wall 24 during the curved air movement and particles so impinging will be deflected and intercepted by a projecting wall or lip 28. The wall 24 extends downward under the lip 28 to the position 30 such that a continuing carrier air flow channel 32 is formed, which continuing air flow carried in such channel will carry the separated particles. The main portion 34 of the channel, carrying the major portion of the air and having little or no foreign particles carried therewith, continues to the air inlet 14. However, the limited carrier air flow channel 32 continues into the annular collector region 26 and in its direction first contacts a deflector 36. In the lower portion of FIGURE 1 it is seen that this deflector 36 will cause particles impinging upon it to be thrown downward to be collected in the bottom portion of the annular collecting region 26a. Just beyond the deflector 36 there is a screen 38 provided which is designed to further separate the air particles before entry into the continuing air channel, and such continuing air channel portion 40 is formed to direct flow in the general direction of the air inlet 14 and channel 40 finally enters the main channel 34 at the region 42 where it is then moving in substantially the same direction as the air in the main channel 34. This air in the so-called continuing carrier, air flow channel of limited extent is now injected into the main air flow 34 and into the air inlet 14 with the objectionable sand and dust particles removed.

The device here disclosed has certain important advantages over prior art devices, including the provision of the curved wall 24 with the adjacent lip 28 which projects above the curved wall at its terminal end 30 and thus forms the entry to a continuing air passage 32 of limited extent at position 30, which serves as a carrier for the air particles to be removed while allowing the major air flow in the channel 34 to continue to the inlet 14. The carrier air flow continues in the air flow channel 32 and contacts the deflector 36, on which contact the major portion of the particles carried and initially picked up by the lip 28 are thrown in a radial and downward direction to the bottom 26a of the particle collecting region 26 and the air flow then continues through the screen 38 to remove additional particles and is then turned in direction into the continuing channel 40, which is the general direction of the main air flow, which it joins at the position 42 and at which time it is traveling in substantially the same direction as the main flow in the channel 34. The main air flow, having greater velocity than the auxiliary flow at 42, also provides suction to assure circulation in channels 32, 40.

It is considered important that the separation of particles is accomplished by an auxiliary air passage and an air flow in said passage carrying the particles which have been separated, thus assuring an uninterrupted flow of a major portion of the air directly into the air inlet 14.

It is noted that the projecting lip 28 is formed by a sheet metal member 29 which extends from the outlet 42 of the channel 40 around to form the lip 28 and then bent backward to form one wall of the auxiliary channel 40, as well as to define the inner wall of particle collecting region 26.

It is noted also that in the preferred form of the invention shown the parts are annular to conform to the engine inlet position and configuration, although important features of the invention could be accomplished by rectangular shaped channels having substantially the same general cross section as shown. Other modifications of the invention are intended within the scope of the following claims.

I claim:

1. A particle separator and collector for removing particles from air entering an engine air inlet, comprising:
   (a) an outer curved wall extending in a direction inward and rearward from a region outboard and forward of said engine air inlet and terminating in an inner edge;
   (b) an inner curved wall spaced from said outer curved wall and defining therewith a curved air passage toward said engine air inlet;
   (c) an annular wall extending forward from the outermost portion of said outer curved wall and forming a particle collecting region forward of said inlet forming spaced curved walls;
   (d) a projecting wall extending from said particle collecting region and bent to form a continuing deflecting air channel adjacent to and spaced from said inner edge of said outer curved wall and positioned to intercept and deflect particles into said particle collecting region which particles have been thrown against said outer curved wall by centrifugal force during air movement toward said air inlet;
   (e) a continuing portion of said intercepting wall extending in the direction of said air inlet and spaced from said inner curved wall providing a continuing portion of said air passage directed toward said air inlet and carrying a major portion of the air flow entering said engine.

2. A particle separator and collector as in claim 1 in which:
   (a) an inner portion of said collection region forming annular wall is spaced radially inward from said projecting intercepting wall and forms an auxiliary air passage therewith;
   (b) a portion of said intercepting wall extending inside said collection region; the portion of said intercepting wall inside said collection region and said inner portion of collection region forming wall form a continuing portion of said auxiliary air passage extending toward said air inlet and thereby exhaust air into said passage in the direction of major air flow therein in such a location as to induce air flow in said auxiliary passage.

References Cited

UNITED STATES PATENTS

| | | | |
|---|---|---|---|
| 470,403 | 3/1892 | Robinson | 55—332 X |
| 520,604 | 5/1894 | Mellin | 55—397 |
| 1,838,117 | 12/1931 | Simms et al. | 55—461 X |
| 2,096,883 | 10/1937 | Clason | 55—468 X |
| 2,193,883 | 3/1940 | Reeves | 55—468 X |
| 2,267,706 | 12/1941 | Baile et al. | 55—461 X |
| 2,509,300 | 5/1950 | Hendrickson | 55—422 X |
| 2,623,610 | 12/1952 | Buechel | 55—306 |
| 2,636,666 | 4/1953 | Lombard | 55—306 X |
| 2,944,731 | 7/1960 | Kastan | 55—306 |

FOREIGN PATENTS

| | | |
|---|---|---|
| 100,393 | 2/1937 | Australia. |
| 45,659 | 5/1932 | Denmark. |
| 390,545 | 2/1924 | Germany. |
| 422,282 | 11/1925 | Germany. |
| 427,468 | 4/1926 | Germany. |
| 364,449 | 1/1932 | Great Britain. |
| 284,789 | 12/1952 | Switzerland. |

FRANK W. LUTTER, *Primary Examiner.*

HARRY B. THORNTON, *Examiner.*

D. TALBERT, *Assistant Examiner.*